May 27, 1930.  K. L. HERRMANN  1,759,943
TRANSMISSION
Filed April 11, 1927  2 Sheets-Sheet 1
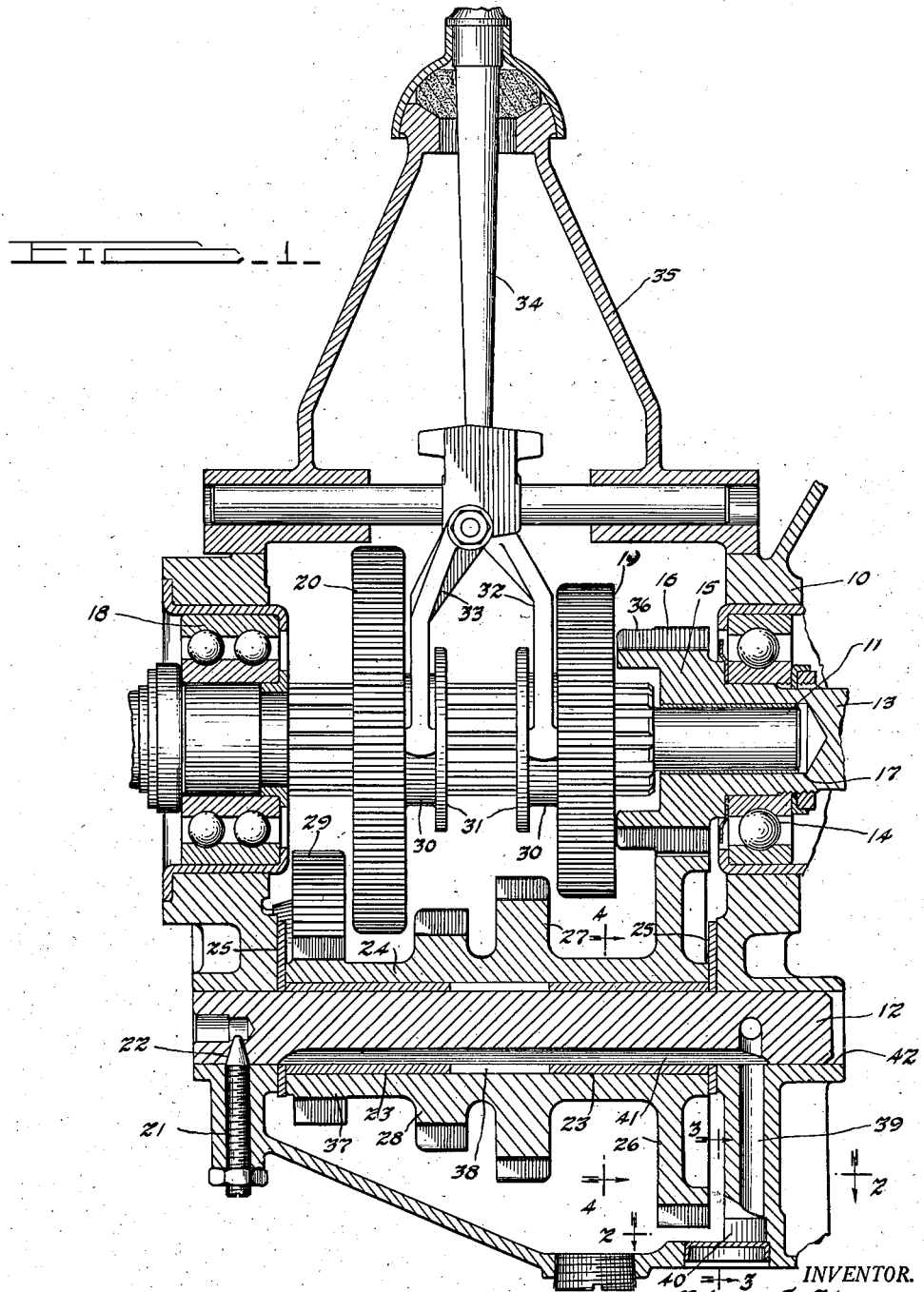
INVENTOR.
Karl L. Herrmann
BY
ATTORNEYS.

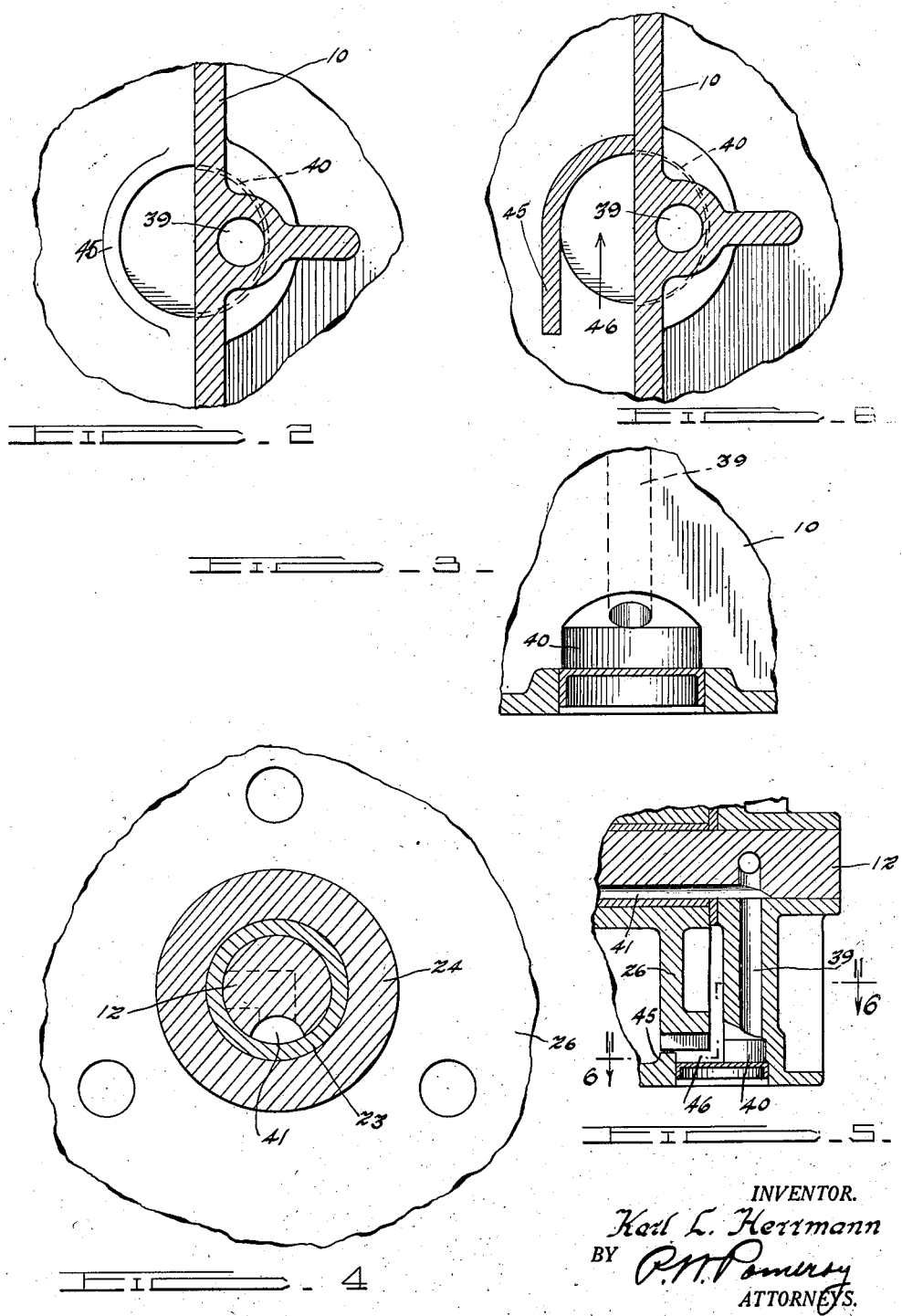

Patented May 27, 1930

1,759,943

UNITED STATES PATENT OFFICE

KARL L. HERRMANN, OF SOUTH BEND, INDIANA, ASSIGNOR TO THE STUDEBAKER CORPORATION, OF SOUTH BEND, INDIANA, A CORPORATION OF NEW JERSEY

TRANSMISSION

Application filed April 11, 1927. Serial No. 182,865.

This invention relates to transmissions for motor vehicles and particularly to the lubrication of the countershaft gears therefor.

The countershaft gears of the conventional vehicle transmission are formed integral with a rotatable hub mounted on a stationary countershaft supported at its end by the transmission case. The ends of the hub abut against bearing surfaces at opposite sides of the transmission case to prevent end play of the gears, and the hub is usually provided with one or more openings through which oil enters to lubricate the bearing surfaces between the countershaft and the hub. This method of lubricating these parts may suffice at low speed, but at high speeds is insufficient for thorough lubrication, as the oil is not permitted to enter the hub openings because of the high speed of rotation thereof. It, therefore, has been found necessary to provide additional means for lubrication of the countershaft gear hub bearing surfaces, and it is the principal object of this invention to provide a new and novel means for lubricating these parts whereby oil is forced thereto by the centrifugal action of one of the countershaft gears.

Another object is to provide a vehicle transmission case with a passage-way leading from the interior thereof to the countershaft whereby lubricant may be forced through the passage-way to the countershaft so that the gears rotating thereon may be lubricated.

Another object is to provide a vehicle transmission with means for lubricating the gears which rotate on the countershaft, comprising a passage-way or conduit in a wall of the transmission case leading from the interior of the transmission to a longitudinal groove in the countershaft, lubricant being forced into the passage-way and into the countershaft groove by the centrifugal action of the gear adjacent to the transmission wall containing the passage-way.

Another object is to provide a vehicle transmission with means for lubricating the hub of the gears rotating on the countershaft, comprising a passage-way in one wall of the transmission case leading from the interior thereof to a groove in the countershaft and a curved baffle positioned around the opening of the passage-way in the case and beneath the gear adjacent the wall containing the passage-way, lubricant being thrown from the gear by centrifugal force against the baffle and directed into the passage-way where it passes to the groove in the countershaft to lubricate the gear hub.

These being among the objects of the present invention, the same consists of certain features of construction and combinations of parts to be hereinafter described with reference to the accompanying drawings, and then claimed, having the above and other objects in view.

In the accompanying drawings, which illustrate a suitable embodiment of the present invention, Figure 1 is a section taken longitudinally through a motor vehicle transmission showing the means for lubricating the countershaft thereof.

Figure 2 is a section taken on the line 2—2 of Figure 1, showing the passage-way that is formed in the transmission wall.

Figure 3 is a section taken on the line 3—3 of Figure 1.

Figure 4 is a section taken on the line 4—4 of Figure 1, showing the longitudinal oil groove in the countershaft.

Figure 5 is a partial longitudinal section taken through the transmission of Figure 1 showing a modified construction embodying a curved baffle positioned beneath the countershaft gear.

Figure 6 is a section of the modified construction taken on the line 6—6 of Figure 5.

Referring to the accompanying drawings in which like numerals refer to like parts throughout the several views, the transmission mechanism is housed within a suitable case 10, which is generally located at the rear of and connected with the engine of the motor vehicle. The transmission mechanism shown in Figure 1 is of conventional construction and comprises a splined horizontal main shaft 11, paralleling which is a countershaft 12, the main shaft 11 being in alignment with a shaft 13 driven by the engine through a conventional clutch mechanism (not shown). The drive shaft 13 is supported by a bearing 14 mounted in the wall of the case 10 and is formed with an integral circular member 15, at its rear end, having a series of gear teeth formed thereon, one end of the main shaft 11 being telescopically received and rotatably supported in a central recess 17 formed in the end of the drive shaft 13 and the other end thereof being supported by a bearing 18 mounted in the opposite wall of the case 10. Slidably mounted on the splined main shaft 11 are the sliding gears 19 and 20.

The countershaft 12 is provided with a recess 22 in one end thereof and is held against rotation by a set screw 21 threaded into the transmission case 10 and projecting into the recess 22. Bushings 23 received by a gear hub 24 are rotatably mounted on the countershaft 12, the gear hub 24 having its ends bearing against plates 25 secured at opposite sides of the transmission case 10, and having a plurality of gears formed integral therewith. These gears consist of a high speed gear 26, which is constantly meshing with the teeth 16 of the gear 15, an intermediate gear 27, a low speed gear 28, and a reverse gear 37, the reverse gear 37 being constantly in mesh with an idler gear 29. The gears 19 and 20 slidably mounted on the splined main shaft 11 are both provided with an extending cylindrical portion 30 terminating in an annular flange 31, which portion 30 receives slidable shifting yokes 32 and 33 adapted to be actuated at different times by a shifter lever 34 carried by the transmission case cover 35.

The transmission mechanism is operated as in all conventional transmissions by engaging the shifting lever 34 with the yoke 33 to slide the gear 20 into mesh with the idler gear 29 to place the vehicle in reverse gear or with the countershaft gear 28 to place the vehicle in low speed gear. The shifting lever 34, if engaged with the shifter yoke 32, is actuated to slide the gear 19 into mesh with the countershaft gear 27 to place the vehicle in intermediate gear, or to slide the gear 19 forward so that internal teeth (not shown) formed in the inner face thereof are telescopically received by extensions 36 of the teeth 16 on the gear 15 to place the vehicle in high gear, high gear being, in effect, a direct drive from the drive shaft 13 to the main shaft 11.

Figure 1, which is an assembly view of the transmission, clearly shows the method of lubricating the hub of the countershaft gears. The end wall of the transmission case is drilled to provide a substantially vertical passage-way or conduit 39 extending from a recess 40, which opens into the interior of the case 10, to the opening 42 which receives and supports the end of the countershaft 12. The countershaft 12 is formed with a hemispherical groove 41 extending longitudinally thereof past the ends of the hub and directly over the passage-way 39 to provide a continuous conduit from the interior of the transmission case to the countershaft 12 along its entire length. The constant mesh gear 26 which is driven at a high rate of speed, acts as a paddle wheel to keep the lubricant in motion and it also throws lubricant from its periphery by centrifugal force. The paddling action of the gear 26 and the lubricant thrown therefrom causes the lubricant to build up between the gear 26 and the transmission case 10 to such an extent that the pressure created forces lubricant into the recess 40 and upwardly through the passage-way 39 into the groove 41, where it is distributed longitudinally along the countershaft 12 to thoroughly lubricate the gear hub 24 and bushings 23, the bushings 23 being spaced in the hub 24 to allow a quantity of lubricant to be retained therebetween.

A modification of the transmission case construction is shown in Figures 5 and 6 to comprise a curved wall or baffle 45 formed integral with the bottom of the transmission case 10 and positioned in close proximity to and directly under the gear 26. The baffle 45 is also positioned in front of the recess 40 and is open only at 46 to provide a pocket directly in the path of the lubricant thrown from the gear 26. The constant mesh gear 26 rotates in the direction shown by the arrow in Figure 6, that is, a clockwise direction as viewed from the rear of the transmission, and lubricant circulated thereby and thrown therefrom by centrifugal force enters through the opening 46 and passes into the recess 40. That portion of the lubricant which does not directly enter the recess 40 strikes the baffle 45 and is directed thereinto where it passes into the passage-way 39, as previously described, to lubricate the bearing surfaces between the gear hub 24 and the countershaft 12.

From the foregoing description the advantages of a transmission provided in this manner with a positive means of lubrication are readily apparent. It is also apparent that the cost of providing this means is very low, as it only necessitates a few simple machining operations for forming a groove in the countershaft and the passage-way in the transmission case wall.

Although the lubricating means embodied in the present invention is shown applied to a vehicle transmission, and that, in a certain location, it is to be understood, however, that the location may be changed to meet various designs of transmissions and also that this means of lubrication may be applied to any device embodying a rotating gear submerged or partly submerged in a fluid lubricant.

Formal changes may be made in the specific embodiment of the invention described without departing from the spirit and substance of the broad invention, the scope of which is commensurate with the appended claims.

What I claim is:

1. In a transmission mechanism, a combination of a casing containing a lubricant, a drive shaft having a gear mounted thereon, a countershaft spaced from said drive shaft, a gear on said countershaft driven by said first gear, and a conduit leading from said countershaft and opening into the interior of said casing below the level of the lubricant adjacent to the periphery of said second gear whereby said lubricant moved by rotation of said gear will be directed into said conduit and conducted to the bearing surface of said countershaft.

2. In a transmission mechanism, a housing containing a lubricant and supporting a shaft having a groove formed therein, a gear rotatable on said shaft dipping in said lubricant, a bearing surface for said gear enclosing a portion of said groove, and a conduit leading downwardly from said groove to an opening in the interior of said housing positioned adjacent to the teeth of said gear whereby lubricant thrown by centrifugal force from said gear is passed upwardly through said conduit to said groove for lubricating said bearing surface.

3. In a transmission mechanism, the combination of a casing containing a lubricant, a stationary grooved shaft mounted in said casing, a gear rotatably mounted on said shaft adapted to throw lubricant from its periphery while rotating, and a conduit opening at one end into said casing below the level of the lubricant therein adjacent to the periphery of said gear and opening at the opposite end into the groove in said stationary shaft, whereby lubricant will be directed into said conduit by the pressure created by the lubricant thrown from said gear and conducted to the groove in said shaft.

4. In a transmission mechanism, the combination of a casing containing a lubricant, a drive shaft having a gear mounted thereon, a non-rotatable shaft having a longitudinally extending groove formed therein spaced from said drive shaft, a rotatable hub mounted on said non-rotatable shaft, a gear formed on said hub adapted to be driven by the gear on said drive shaft, and a conduit in the wall of said casing having communication with the groove in said non-rotatable shaft and with the interior of said casing adjacent to the periphery of said gear for conducting oil to said groove in said shaft to lubricate said hub rotating thereon, said oil being forced into said conduit by the centrifugal action of said second gear.

5. In a vehicle transmission having a housing containing a lubricant, a drive shaft having a gear mounted thereon, and a stationary shaft supported by said housing, a hub rotatably mounted on said shaft extending between the walls of said housing, a gear formed on said hub driven by the gear on said drive shaft, and a continuous conduit extending from the interior of said housing to said shaft and along the surface thereof, said conduit opening into the interior of said housing through an opening adjacent the teeth of said gear whereby oil set in motion by said gear will be forced into and through said conduit to lubricate said hub rotating on said shaft.

6. A vehicle transmission having a housing containing a lubricant and a longitudinally grooved shaft supported by said housing, spaced bushings surrounding said shaft and enclosing a portion of said groove, a hub having a gear formed thereon receiving said bushings, and a conduit in a wall of said housing, said conduit having communication with said groove on said shaft and opening into the interior of said housing at a point adjacent the outer circumference of said gear whereby lubricant thrown from said gear by rotation thereof will be forced into said conduit, and into said groove to the space between said bushings for lubricating the bearing surfaces between said shaft and said bushings.

7. In a vehicle transmission, the combination with a housing containing a lubricant and having a shaft therein, of a rotatable gear on said shaft dipping in said lubricant, a conduit leading from said shaft and opening into the interior of said housing, and a baffle positioned below said gear and in front of the opening of said conduit into said housing to provide a pocket in the path of lubricant thrown by rotation of said gear to direct said lubricant into said conduit.

8. In a transmission mechanism, a housing containing a lubricant and supporting a shaft having a groove formed therein, a rotatable gear mounted on said shaft dipping in said lubricant, a bearing surface enclosing a portion of said groove, a conduit leading from said groove to an opening in the interior of said housing, and a baffle in front of said opening and below said gear in the path of lubricant thrown from said gear for directing said lubricant into said conduit for lubricating said bearing surface.

9. In a vehicle transmission, the combination with a housing having a shaft therein provided with a groove, and a rotatable gear on said shaft dipping in lubricant contained within said housing, of a conduit opening at one end into said groove and opening at the other end into the interior of said housing, and a baffle positioned in front of the opening of said conduit into said housing and below said gear to provide a pocket in the path of said lubricant thrown by centrifugal force from said gear to direct said lubricant into said conduit.

Signed by me at South Bend, Indiana, this 7th day of April, 1927.

KARL L. HERRMANN.